(12) United States Patent
Garcia et al.

(10) Patent No.: US 10,731,629 B2
(45) Date of Patent: Aug. 4, 2020

(54) WIND POWER PLANT CONTROLLER

(71) Applicant: VESTAS WIND SYSTEMS A/S, Aarhus N (DK)

(72) Inventors: Jorge Martinez Garcia, Aarhus N (DK); Kouroush Nayebi, Ikast (DK); Rubin Panni, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/220,830

(22) Filed: Dec. 14, 2018

(65) Prior Publication Data

US 2019/0120207 A1    Apr. 25, 2019

Related U.S. Application Data

(63) Continuation of application No. 14/895,329, filed as application No. PCT/DK2014/050139 on May 21, 2014, now Pat. No. 10,197,042.

(30) Foreign Application Priority Data

Jun. 3, 2013   (DK) .................................. 2013 70304

(51) Int. Cl.
*F03D 7/02* (2006.01)
*F03D 9/25* (2016.01)
(Continued)

(52) U.S. Cl.
CPC .......... *F03D 7/0284* (2013.01); *F03D 1/0666* (2013.01); *F03D 7/048* (2013.01);
(Continued)

(58) Field of Classification Search
CPC ...... F03D 7/0284; F03D 9/257; F03D 1/0666; F03D 7/048; G05B 15/02; H02J 3/386; Y02E 10/721; Y02E 10/763; Y02E 10/723
(Continued)

(56) References Cited

U.S. PATENT DOCUMENTS 7,372,173 B2 *   5/2008   Lutze ................... F03D 7/0284
                                                         290/44
2003/0011348 A1 *   1/2003   Lof ......................... H02J 3/381
                                                         322/37
(Continued)

FOREIGN PATENT DOCUMENTS

CN       102077437 A     5/2011
CN       102177636 A     9/2011
(Continued)

OTHER PUBLICATIONS

El-Tamaly et al.: "Computer modeling and simulation of wind energy system connected to utility grid", Electrical, Electronic and Computer Engineering, 2004. ICEEC '04, pp. 879, 882, Sep. 2004.
(Continued)

*Primary Examiner* — Kenneth M Lo
*Assistant Examiner* — Mohammed Shafayet
(74) *Attorney, Agent, or Firm* — Patterson + Sheridan, LLP

(57) ABSTRACT

The present invention relates a power plant controller (PPC), the power plant controller to control produced power from a wind power plant (WPP), the wind power plant comprises at least a plurality of wind turbine generators, the wind power plant being connected to an electrical grid, wherein the power plant controller, in the event of receiving a signal indicative of a predefined event in the wind power plant, is capable of controlling the wind power plant so that the
(Continued)

produced power, from the wind power plant to the electric grid, is a negative amount of active power. The invention also relates to a method for controlling a wind power plant connected to an electrical grid, the wind power plant comprises a plurality of wind turbine generators.

15 Claims, 11 Drawing Sheets

(51) Int. Cl.
*F03D 7/04* (2006.01)
*H02J 3/38* (2006.01)
*F03D 1/06* (2006.01)
*G05B 15/02* (2006.01)

(52) U.S. Cl.
CPC ............ *F03D 9/257* (2017.02); *G05B 15/02* (2013.01); *H02J 3/386* (2013.01); *Y02E 10/721* (2013.01); *Y02E 10/723* (2013.01); *Y02E 10/763* (2013.01)

(58) Field of Classification Search
USPC .......................................................... 700/287
See application file for complete search history.

(56) References Cited

U.S. PATENT DOCUMENTS

| | | | |
|---|---|---|---|
| 2005/0028017 A1* | 2/2005 | Janakiraman | G06F 1/263 713/340 |
| 2005/0040655 A1* | 2/2005 | Wilkins | F03D 7/02 290/44 |
| 2005/0042098 A1* | 2/2005 | Wobben | F03D 7/0272 416/132 B |
| 2007/0177314 A1* | 8/2007 | Weng | H02P 9/007 361/20 |
| 2009/0021013 A1* | 1/2009 | Andresen | F03D 7/0272 290/44 |
| 2009/0218817 A1* | 9/2009 | Cardinal | F03D 7/028 290/44 |
| 2010/0025994 A1 | 2/2010 | Cardinal et al. | |
| 2010/0142237 A1* | 6/2010 | Yuan | H02J 3/386 363/97 |
| 2011/0089694 A1* | 4/2011 | Arinaga | F03D 7/0224 290/44 |
| 2011/0140428 A1* | 6/2011 | Wakata | F03D 7/0284 290/44 |
| 2011/0144816 A1* | 6/2011 | Morjaria | F03D 7/0276 700/287 |
| 2011/0166717 A1* | 7/2011 | Yasugi | F03D 7/0284 700/287 |
| 2011/0204630 A1* | 8/2011 | Arinaga | F03D 7/0272 290/44 |
| 2011/0204720 A1* | 8/2011 | Ruiz | G06Q 50/06 307/66 |
| 2011/0276194 A1* | 11/2011 | Emalfarb | H02J 3/32 700/297 |
| 2011/0304295 A1* | 12/2011 | McNally | H01M 10/46 320/101 |
| 2012/0053837 A1* | 3/2012 | Viassolo | H01M 10/46 702/1 |
| 2012/0083935 A1* | 4/2012 | Wells | H02J 3/381 700/292 |
| 2012/0101643 A1* | 4/2012 | Kirchner | F03D 7/0284 700/287 |
| 2012/0203384 A1 | 8/2012 | Arlaban Gabeiras et al. | |
| 2012/0205912 A1* | 8/2012 | Wakasa | F03D 7/0284 290/44 |
| 2013/0026756 A1* | 1/2013 | Andresen | H02J 3/50 290/44 |
| 2013/0140820 A1* | 6/2013 | Tarnowski | F03D 7/0284 290/44 |
| 2013/0187385 A1* | 7/2013 | Wakasa | H02P 9/04 290/44 |
| 2013/0257051 A1* | 10/2013 | Spruce | F03D 7/028 290/44 |
| 2014/0015250 A1* | 1/2014 | Teodorescu | F03D 7/0284 290/44 |

FOREIGN PATENT DOCUMENTS

| | | |
|---|---|---|
| CN | 103004050 A | 3/2013 |
| DK | 2238665 T3 | 11/2011 |
| EP | 1775819 A2 | 4/2007 |
| EP | 1855367 A1 | 11/2007 |
| EP | 2017936 A1 | 1/2009 |
| EP | 2573895 A1 | 3/2013 |
| FR | 2956531 A1 | 8/2011 |
| WO | 2004104718 A1 | 12/2004 |
| WO | 2010/085987 A2 | 8/2010 |
| WO | 2010/114792 A1 | 10/2010 |
| WO | 2011/092193 A2 | 8/2011 |

OTHER PUBLICATIONS

Danish Search Report for PA 2013 70304, dated Jan. 17, 2014.
Chinese Office Action for Application No. 201910308157.3 dated Apr. 13, 2020.

* cited by examiner

1800

START

| Provide at least reactive power to the electrical grid | 1805 |

| Receive signal indicative of requirement to charge energy storage unit | 1815 |

| Determine that amount of active power required to charge the energy storage unit is greater than an amount of active power generated | 1825 |

| Impose one or more negative active power limits for a net active power provided from the wind power plant to the electrical grid | 1835 |

| Charge the energy storage unit at least partly using power drawn from the electrical grid | 1845 |

END

FIG. 18

WIND POWER PLANT CONTROLLER

CROSS-REFERENCE TO RELATED APPLICATIONS

This application is a continuation of co-pending U.S. patent application Ser. No. 14/895,329, filed Dec. 2, 2015 and entitled "WIND POWER PLANT CONTROLLER", which is a national stage entry of PCT/DK2014/050139 filed May 21, 2014, which claims priority to Denmark PA 2013 70304 filed Jun. 3, 2013. Each of these applications is incorporated by reference in its entirety.

FIELD OF THE INVENTION

The present invention relates to a power plant controller (PPC), the power plant controller to control produced power from a wind power plant (WPP), the wind power plant comprises at least a plurality of wind turbine generators, the wind power plant being connected to an electrical grid.

BACKGROUND

With increasing penetration of wind power generation, the requirements for the connection of Wind Power Plants (WPP) to the electrical grid are defined by new and emerging grid connection codes. The grid connection requirements vary in different parts of the world, but they share common aims, like to permit the development, maintenance, and operation of a coordinated, reliable, and economical transmission or distribution system. Wind power plants differ from other traditional generation sources; thus, they are particular in certain aspects of their control and layout. Therefore, replacing traditional power plants, including their control characteristics, during periods of little or very low wind speed could be a concern. Grid operators are solving this challenge by means of redacting specific sections in the grid codes for WPP performance.

The increasing penetration of wind power generation also pushed for better utilization of the features present in the wind turbine generators

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, the present invention relates to a power plant controller (PPC), the power plant controller being arranged to control produced power from a wind power plant (WPP), the wind power plant comprises at least a plurality of wind turbine generators, the wind power plant being connected to an electrical grid, wherein the power plant controller, in the event of receiving a signal indicative of a predefined event in the wind power plant, is capable of controlling the wind power plant so that the produced power, from the wind power plant to the electric grid, is a negative amount of active power.

An advantage of the first aspect is mainly that the power plant controller allows the wind power plant to produce a negative amount of active power, and at the same time is it the power plant controller that controls the actual amount of negative, instead of each individual wind turbine generator consumes an unlimited amount of active power.

According to one embodiment of the invention the power plant controller being arranged for controlling produced power from a wind power plant (WPP) by controlling an electric parameter, wherein the electrical parameter, comprises one or more parameters selected from: active power, reactive power, power factor, voltage and current.

An advantage of this embodiment is that the power plant controller controls the electrical parameter, most suitable for the present situation in the wind power plant.

According to one embodiment of the invention the negative amount of active power is limited by the power plant controller to a first active power limit.

An advantage of this embodiment is that a power plant controller with negative active power is limited and thus the power plant is operated accordingly. The cost of having huge power converters in no-operation mode during periods with no wind is simply too high. On the other hand plant owners want to have a limit to the active power drawn from the grid.

According to one embodiment of the invention a reactive power reference is set to zero, if the negative amount of active power exceeds the first active power limit.

An advantage of this embodiment is that whenever the active power goes below the first active power limit, then the reactive power contribution to the grid is set to zero, thereby eliminating a main source of losses as the power converters in the wind turbine generators will stop producing reactive.

According to one embodiment of the invention a reactive power reference is limited to a first reactive power limit.

An advantage of this embodiment is that the losses are reduced as the power plant is limited in it reactive power production to a first reactive power limit.

According to one embodiment of the invention the reactive power reference is controlled according to a power factor limit.

An advantage of this embodiment is that the ratio between active power and reactive power is maintained within the power factor limit.

According to one embodiment of the invention the power factor limit is inductive or capacitive.

An advantage of this embodiment is that the power plant controller can limit the operation of the power plant to be in an inductive or a capacitive mode.

According to one embodiment of the invention the reactive power reference is limited to a second reactive power limit, if the negative amount of active power exceeds a second active power limit.

An advantage of this embodiment is that an additional threshold value for the amount of negative active power is set, and whenever this threshold is exceeded the reactive power is limited to a second reactive power limit.

According to one embodiment of the invention the first active power limit or second active power limit is set according to a cost function of the active power.

An advantage of this embodiment is that the active power limits can changes as a function of kWh price, or as function of the relationship between costs of kWh/cost of kVArh.

According to one embodiment of the invention the first active power limit or second active power limit is/are set according to losses in the wind power plant.

An advantage of this embodiment is that the losses in the wind power plant can be limited to either a specific numerical kWh, or a specific kW, or even a p.u. value of the installed capacity of the wind power plant.

According to one embodiment of the invention the first active power limit and/or second active power limit is/are implemented with a hysteresis band and/or timer function.

An advantage of this embodiment is the hysteresis band ensures a more smooth operation as the power plant controller is more likely to stay in the same operational setting.

In a second aspect, the present invention relates to a wind power plant arranged to be controlled by a power plant controller according to the above mentioned embodiments.

The advantages of the second aspect and its further embodiments are equivalent to the advantages for the first aspect of the present invention.

In a third aspect, the present invention relates to a method for controlling a wind power plant connected to an electrical grid, the wind power plant comprises a plurality of wind turbine generators, the method comprising receiving a signal indicative of a predefined event in the wind power plant, controlling the wind power plant so that the produced power, from the wind power plant to the electric grid, is a negative amount of active power.

According to one embodiment of the invention, the method further comprising, dispatching a wind turbine control reference to each of the plurality of wind turbine generators, wherein said wind turbine control reference is an electric parameter, comprising one or more parameters selected from: active power, reactive power, power factor, voltage and current.

The advantages of the third aspect and its further embodiments are equivalent to the advantages for the first aspect of the present invention.

The first, second and third embodiment of the present invention may each be combined with any of the other aspects. These and other aspects of the invention will be apparent from and elucidated with reference to the embodiments described hereinafter.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE DRAWINGS

The figures show one way of implementing the present invention and is not to be construed as being limiting to other possible embodiments falling within the scope of the attached claim set.

FIG. 18 shows a flow chart of an exemplary method for controlling a wind power plant connected to an electrical grid.

DETAILED DESCRIPTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
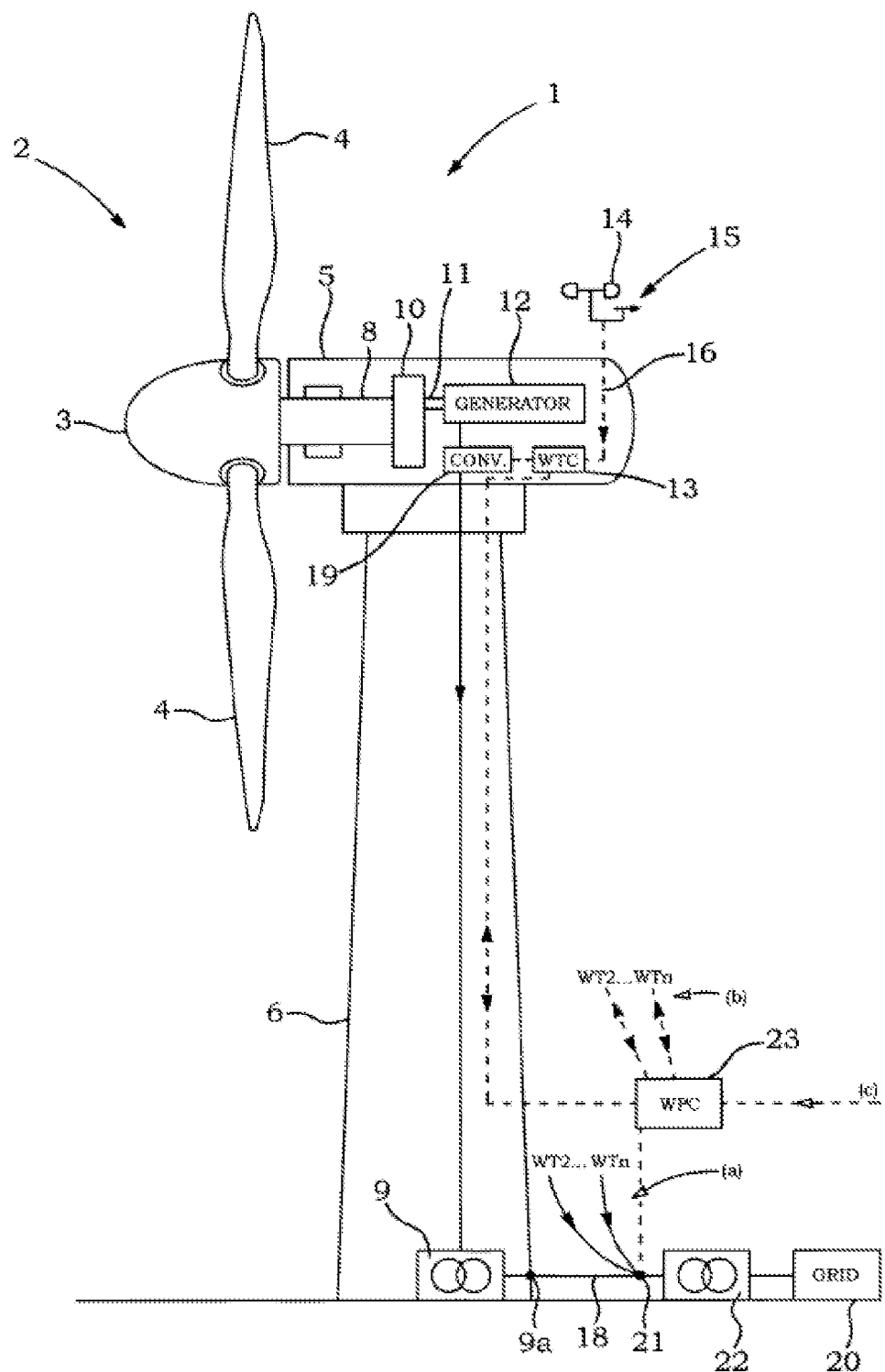
FIG. 1 shows a wind turbine generator according to the present invention.

FIG. 1 shows, an exemplary variable-speed wind turbine generator (WT) 1 is one of a plurality of wind turbine generators of a wind power plant (WPP). It has a rotor 2 with a hub 3 to which, e.g., three blades 4 are mounted. The pitch angle of the rotor blades 4 is variable by means of pitch actuators. The rotor 3 is connected to a nacelle 5 supported by a tower 6 and drives a generator 12 via a main shaft 8, a gearbox 10, and a high speed shaft 11. This structure is exemplary; other embodiments, for example, use a direct-drive generator.

The generator 12 (e.g. Induction or synchronous generator) produces electrical output power of a frequency related to the rotation speed of the rotor 3, which is converted to grid frequency (e.g. about 50 or 60 Hz) by a converter 19. The voltage of the electric power thus produced is up-transformed by a transformer 9. The output of the transformer 9 is the wind turbine generator's terminals 9a. The electric power from the wind turbine generator 1 and from the other wind turbine generators of the wind power plant is fed into a wind power plant grid 18 (symbolized by "a" in FIG. 1). The internal wind power plant grid 18 is connected at a point of common coupling 21 and an optional further step up transformer 22 to a wind power plant external electrical utility grid 20. The grid 20 is equipped with various regulation capacity against grid fluctuations, e.g. in the form of conventional producers which can increase and lower production on a short-time scale to control voltage and frequency.

A control system includes a wind-turbine controller 13 and a power plant controller 23. The power plant controller 23 controls operation of the individual wind turbine generator 1, e.g. selects the full-load or partial-load operation mode, depending i.a. on the current wind speed, causes, in the partial load mode, operation of the wind turbine generator at the optimal working point by adjusting the blade angle and controlling the tip speed ration to the aerodynamic optimum at the current wind speed, and controls the converter 19 to produce electricity according to prescriptions of the power plant controller, e.g. an instruction to provide a certain amount of reactive power in addition to the active power, etc. The power plant controller 13 uses different input signals to perform its control tasks, for example signals representing current wind conditions (e.g. from an anemometer 14 and a wind vane 15 transmitted via line 16), feed-back signals representing pitch angle, rotor position, amplitudes and phases of the voltage and current at the generator 12 and the terminals 9*a*, etc., and command signals from the power plant controller 23. The power plant controller 23 receives signals representative of the voltage, current and frequency at the point of common coupling 21 (parameters which may be considered to represent the voltage, current and frequency in the utility grid 20) and, optionally, receives information or command signals from the utility-grid provider (at "c" in FIG. 1). Based on some of these (and, optionally, further) input parameters the power plant controller 23 monitors grid stability and, upon detection of a reduction of grid stability, commands the wind-turbine controllers 13 of the wind turbine generator 1 and the other wind turbine generators of the wind power plant 2 (at "b" in FIG. 1) to change operation by limiting fluctuations of the output power supplied. Upon receipt of such a command the wind-turbine controller 13, upon increase of the wind speed, cuts the high-output peak which would then be produced in normal partial-load operation with maximum efficiency, e.g., by adjusting the blade-pitch angle towards the flag position, to comply with the power plant controller's limit-fluctuation command. Thus, in the exemplary embodiment of FIG. 1 the control task of the control system to limit output fluctuations is shared by the power plant controller 23 and the wind-turbine controller 13. In other embodiments this control task is performed by the wind turbine controller 13 alone; in those embodiments, the "control system" is represented just by the wind turbine controller 13, without a power plant controller 23.

Although the wind turbine generator 1 shown in FIG. 1 is expected to have three blades 4, it should be noted that a wind turbine generator may have different number of blades. It is common to find wind turbine generators having two to four blades. The wind turbine generator 1 shown in FIG. 1 is a Horizontal Axis Wind Turbine (HAWT) as the rotor 4 rotates about a horizontal axis. It should be noted that the rotor 4 may rotate about a vertical axis. Such a wind turbine generators having its rotor rotate about the vertical axis is known as a Vertical Axis Wind Turbine (VAWT). The embodiments described henceforth are not limited to HAWT having 3 blades. They may be implemented in both HAWT and VAWT, and having any number of blades 4 in the rotor 4.

Some embodiments pertain to a control system arranged to control at least one wind turbine generator 1 which may include some, or all, of the wind turbines of a whole wind park, in the manner describe above. The control system can be distributed, e.g. include controllers at the wind power plant and the wind turbine generator level or utility-grid level.

Figure 2:
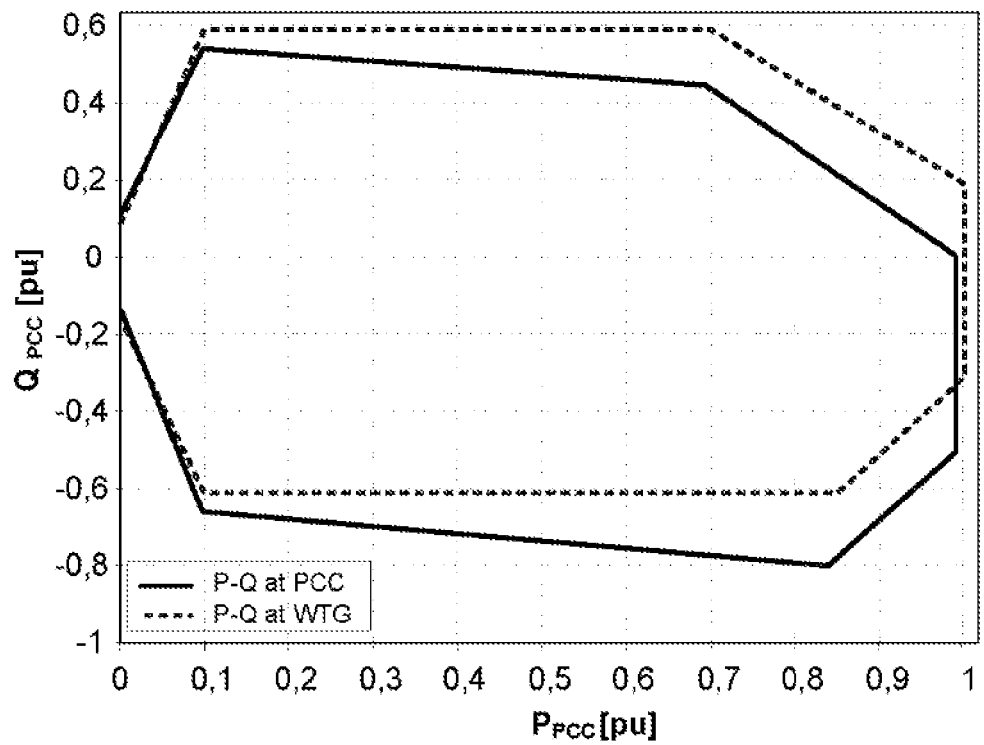
FIG. 2 shows a PQ-chart of a wind turbine and power plant according to the prior art.

FIG. 2 shows a PQ-chart from a wind turbine generator (WTG) and point of common coupling (pcc) of a wind power plant according to the prior art, where operation of the wind turbine generators and also wind power plant was only allowed for positive P (active power), i.e. first and fourth quadrant.

Figure 3:
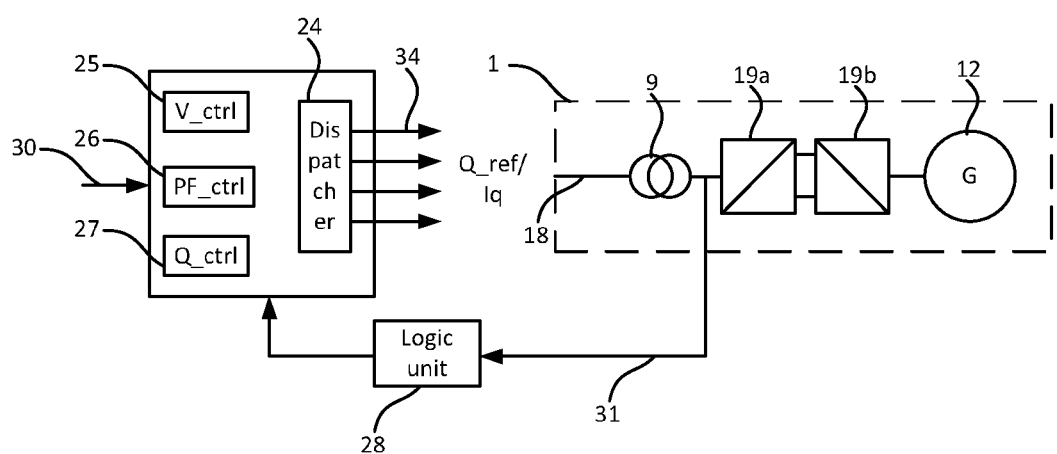
FIG. 3 shows a power plant controller connected to a wind power plant.

FIG. 3 shows a power plant with one wind turbine generator 1 and a controller 23 according to an embodiment of the invention. FIG. 3 only shows one wind turbine generator 1, which comprises similar elements as described in relation to FIG. 1. In FIG. 3 the Figure only shows a generator 12, connected to, and feeding power to a power rectifier 19*b*, that converts variable frequency AC power to DC power, an inverter 19*a* converts the DC power into fixed frequency AC power, the AC power is the transformed to a higher voltage level in a transformer 9, the higher voltage AC power is fed into the wind power plant grid 18, 202. A signal vector 31 containing power production information about the individual wind turbine generator 1, is communicated to the power plant controller 23, from all the other wind turbine generators 1 in the wind power plant. The signal 31 may contain information about the voltage level of the wind turbine generator, at either side of the transformer 9. Often it is beneficial to measure the voltage level at the low voltage side of the transformer, and possibly translate the measurement to a value on the high voltage side of the transformer. Measurements 32 or 33 are measured at a point of measurement 204*a* or 204*b*, "a" or "b" depending on which side of the point of common coupling 201 the actual measurement is taken.

The power plant controller 23 receives a set point 30 to follow from e.g. a grid system operator, and has, depending on the specific plant, different modes of control 25, 26, 27 between which the power plant controller can choose. This may be voltage control 25, power factor control 26, and Q (reactive power) control 27. A state machine of the power plant controller 23 changes the mode, if so required. The dispatcher 24 dispatches a set point 34 to each of the wind turbine generators 1 in the wind power plant. The dispatcher 24 regularly dispatches or communicates set points 34 to the wind turbine generators 1, whenever required.

An increase in reactive power will increase the voltage level at the wind turbine generator terminals, so being in a situation with higher voltage than asked for by the set point 30, the reactive power production needs to be decreased; this is achieved by sending a reactive power set point with a decreased reactive power value. Similarly, being in a situation with lower voltage than required the reactive power set point should be increased in order to raise the voltage level the voltage level at the wind turbine generator terminals.

Often wind power plants, in steady state operational mode, is controlled according to a Power Factor set point, this implies that for a given active power production a corresponding amount of reactive power, inductive or capacitive, needs to be present as well, as the power factor of an AC electrical power system is defined as the ratio of the real power flowing to the load to the apparent power in the circuit.

Other operational mode can be Q control, where the actual amount of reactive power is controlled, thus not in respect of the active power production. Yet another mode can be voltage control where the voltage level is the control parameter, this control is performed by injecting reactive power, inductive or capacitive into the grid and thereby increasing or decreasing the voltage level.

The different operational modes Q control (reactive power control), power factor control, voltage control, or even current control can be implemented in embodiments of the invention. Thus the invention is not limited to controlling the reactive power.

The production of active power from each of the plurality of wind turbine generators 1 will of course to a large extent depend on the actual wind speed in the surrounding of the wind power plant. In situations where the wind speed is very low or close to zero, the wind turbine generator 1 can't produce any active power, nevertheless the WTG 1 may still produce some amount of reactive power, depending on the actual WTG generator 12 and converter 19 designs.

The actual design of FIG. 3, shows a WTG 1, with a full scale inverter 19, capable of operating the grid side inverter 19a as a STATCOM. Operation of power inverters 19, always require some active power in losses. So even if the all the WTG's 1 in a wind power plant were in stand still due to lack of wind speed and if the all supplied reactive power through the grid side inverter 19a, the power plant would consume an amount of active power from the electrical grid 20.

Any kind of mechanical or electrical equipment causes some losses, i.e. friction, electrical resistance, magnetic losses in the generator and semiconductor losses, just mention some. In addition to the previous mentioned losses, a wind turbine generator requires some power to operate auxiliary equipment in the turbine, such as hydraulic pumps for pitch actuators, cooling fans, yaw motors, etc.

So even if the rotor blades 4 are rotating and the wind is blowing there can be situation where the net active power to the grid is zero or negative. Traditionally such an operation mode has not been favoured as the turbine owner would have to pay for the power consumed by the wind turbine generator. Nevertheless the ability to have the wind turbine generators in an operational mode where they even can provide reactive power and thereby voltage support can in many situations justify the cost of the consumed power.

Wind turbine generators equipped with a doubly fed induction generator or directly connected induction generator, operates during low wind speed in situations where the wind turbine generators switch in and out of motor/generating mode, as the initial losses can be rather high.

Situations that brings the WPP into a negative active power situation:
  Very low wind speed
  High losses in the WPP, often at low wind speed, the WTG's are producing power, but less than the actual losses in the WPP.
  Wind power plants with energy storage, periods may occur where the energy storage has to be charged even though the energy to do has partly to be drawn from the electrical grid 20.

Figure 4:
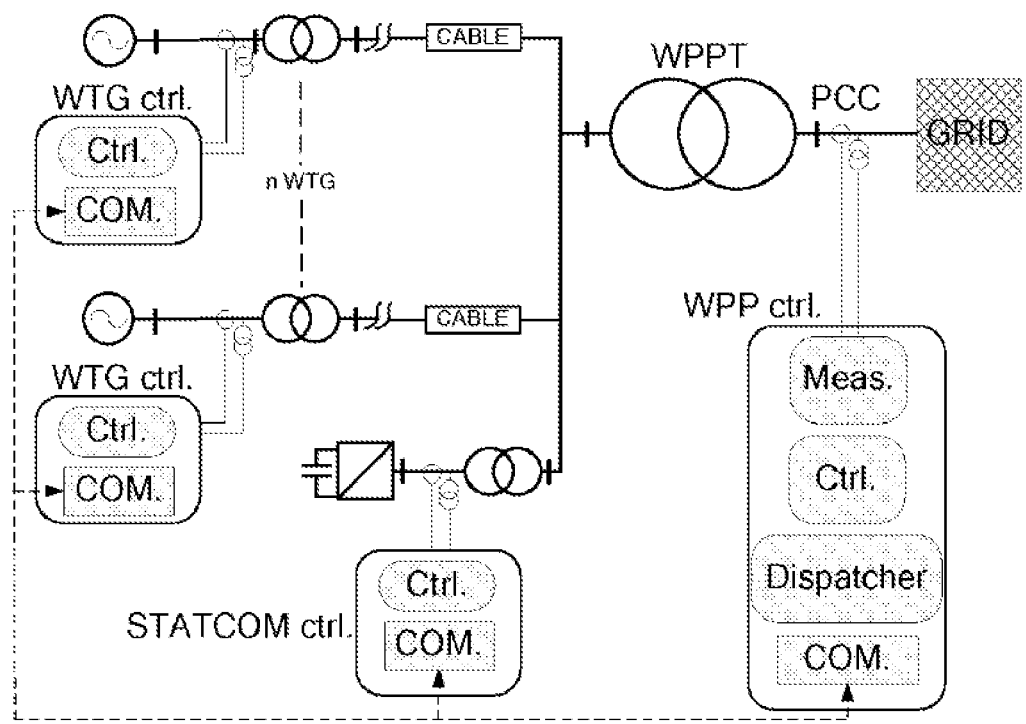
FIG. 4 shows the layout of a wind power plant according to an embodiment of the invention.

FIG. 4 shows similar to FIG. 3 a wind power plant (WPP) controller for controlling the characteristics of the power injected at the PCC. Therefore, a centralized plant controller (WPP Ctrl.) is needed to supervise the power injected at PCC. The plant controller receives the references and feed-back (measurements) and outputs the turbine set-points. The plant controller is formed by a measurement device, which senses the currents and voltages at the PCC, a dedicated computer which allocates the control algorithms, and a communication hub. The communication hub will exchange control references and other signals with a large amount of WTGs (WTG Ctrl.) using the communication WPP Ethernet network and particular protocols.

Still referring to FIG. 4 the dispatcher of the WPP controller has the functionality of splitting the reference calculated by the WPP controller into the different power generating units constituting the WPP. The way of splitting the reference can be done following several strategies, e.g. minimization of loss of energy production. One strategy could be to use a static synchronous compensator (STATCOM) as a reactive power back-up for the system in case the reactive power injected by the WTGs is not sufficient for grid code fulfilment.

The power plant controller 23 measures and monitors several parameters and operates accordingly, the event of receiving a signal indicative of a predefined event in the wind power plant, can be that the wind speed is below a specific value, or simply to observe that the produced active power at the point of common coupling is below zero. Other events could be that an energy storage units needs to charge during low active power production.

In embodiment a demand for high amount of reactive that would cause high losses wind power plant or even require a reduction in active power in order to stay within the rated current limits could be the predefined event.

The design logic of the Q limitations is summarized below, and the notations are also used in the FIG. 5 to FIG. 16:
  Pmin and Plimit are user selectable and settable values.
  Always Pmin<=0
  Always Plimit<=Pmin
  If Q limits and PF limits are enabled then user "Qcap limit" and "Qind limit" limits only apply for the positive P area.
  If Pmeas<=Plimit±hysteresis, then Q limits are set to 0.
  User Hysteresis is a combination of user settable ΔP and a timer.
  User Hysteresis for Pmin only apply when using Q limits
  With PF control only PF limits, and PF limits+Q limits can be used. Note that as soon as the control is set in PF at least the PFlim its has to be used. No option for only Qlimits exits in PF control.
  With Q, Vslope it can be used: either PF limits, or Q limits or PF limits+Q limits
  With Vpi no Q limitation at PCC is used.
  For Doubly Fed Induction (DFIG) machines Plimit can be set to zero by user. DFIG cannot produce but STATCOM can.
  When Pmin is enabled and also the PF limits, the Q limits between Pmin and Plimit are calculated by using PFlim its cap., ind. and the Pmin, additionally in this case no hysteresis is used in Pmin.

Similar logical statement can be derived for control of the other mentioned operational modes; power factor control, voltage control or even current control.

In an embodiment the negative active power is limited as a function of a cost function. Meaning that the Plimit (first active power limit) changes as a function of kWh price, or as function of the relationship between cost of kWh/cost of kVArh, the later of mainly applicable in areas where reactive power has a price, either where consumers are charged for using reactive power (i.e. low PF) or where power plant owner get paid for providing reactive power.

In an embodiment the transition from one operational state to another is limited by hysteresis bands. These hysteresis bands are mainly used for the first and second active power, i.e. Plimit and Pmin. The hysteresis bands are derived from a change in active power (ΔP) and a timer function.

In an embodiment the first active power limit and/or second active power limit are set according to losses in the wind power plant, thereby limiting the losses.

Figure 5:
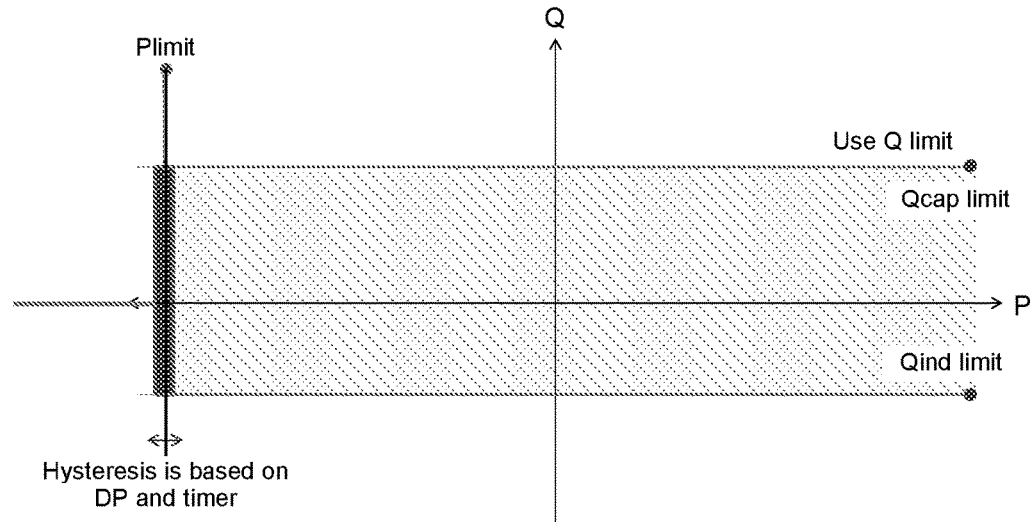
FIG. 5 shows PQ chart with the following case: UseQlimits=1, UsePFlimits=0, Use Pmin=0 and Use Plimit=1.

FIG. 5 shows PQ chart with the following case: Use Qlimits=1, UsePFlimits=0, Use Pmin=0 and Use Plimit=1. The power plant can thus operate within the dotted area. Limited in the negative active power by Plimit and constrained in the reactive by Qcap limit and Qind limit, as the "flag" Qlimits is set to one.

Figure 6:
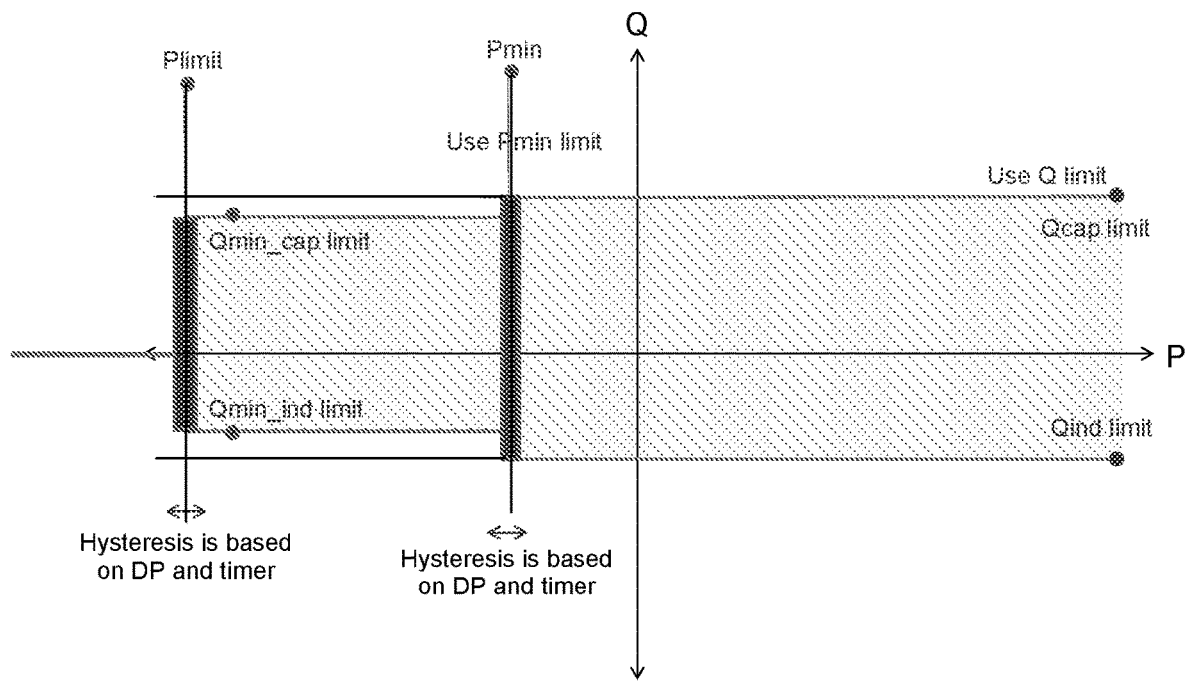
FIG. 6 shows PQ chart with the following case: Use Qlimits=1, Use PFlimits=0, Use Plimit=1 and Use Pmin=1.

FIG. 6 shows PQ chart with the following case: Use Qlimits=1, Use PFlimits=0, Use Plimit=1 and Use Pmin=1. The power plant can thus operate within the dotted area. Limited in the negative active power by Plimit and constrained in the reactive by Qcap limit and Qind limit, as the "flag" Qlimits is set to one. In addition to FIG. 5 here the power plant controller also has set the "flag" Pmin to 1, so the reactive power production is constrained to Qmin_cap limit and Qmin_ind limit whenever the negative active power is below Pmin limit.

In an embodiment the thresholds Pmin and/or Plimit are governed by a hysteresis band. This may apply to all of the FIG. 5 to FIG. 16.

Figure 7:
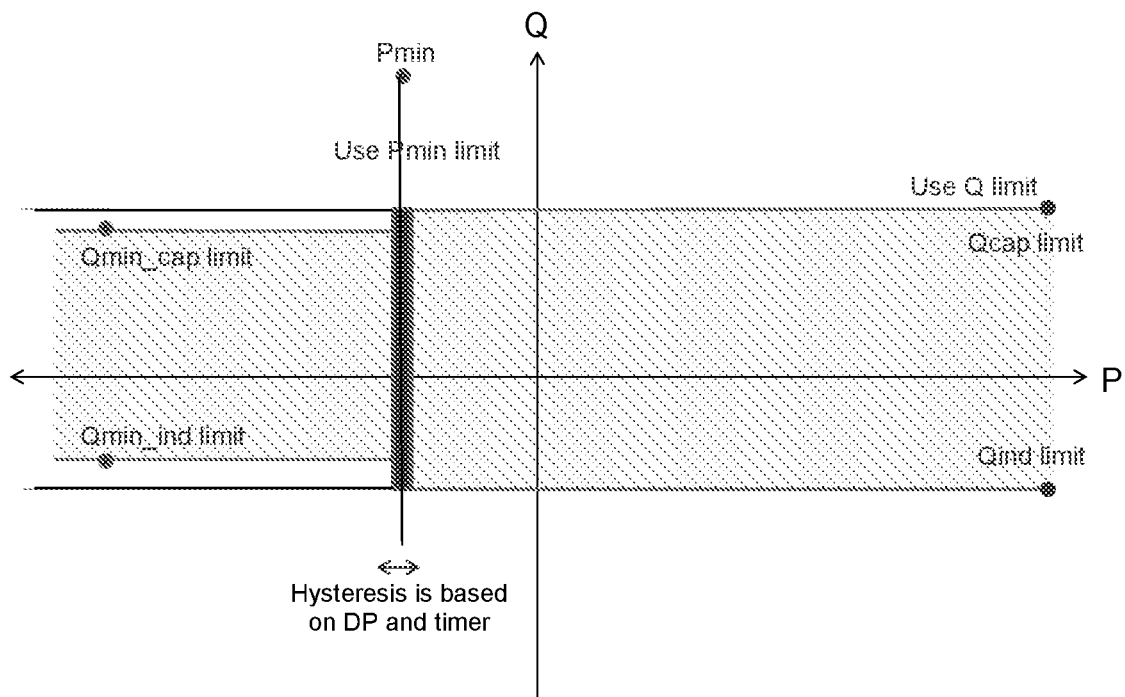
FIG. 7 shows PQ chart with the following case: Use Qlimits=1, Use PFlimits=0, Use Plimit=0 and Use Pmin=1.

FIG. 7 shows PQ chart with the following case: Use Qlimits=1, Use PFlimits=0, Use Plimit=0 and Use Pmin=1. FIG. 7 differs from FIG. 6 in that the Plimit is not set and thus the negative active power is not limited, except that the Pmin is set so the Qmin_cap limit and Qmin_ind limit applies.

Figure 8:
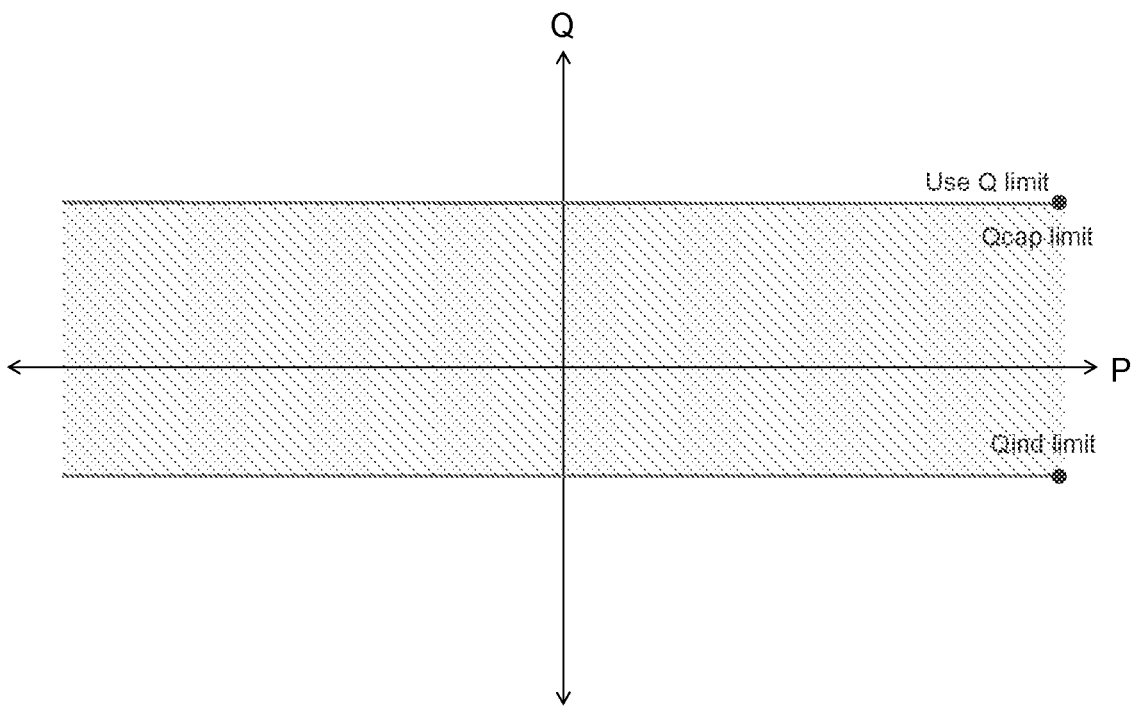
FIG. 8 shows PQ chart with the following case: Use Qlimits=1, Use PFlimits=0, Use Plimit=0 and Use Pmin=0.

FIG. 8 shows PQ chart with the following case: Use Qlimits=1, Use PFlimits=0, Use Plimit=0 and Use Pmin=0. In this Figure only the reactive power is limited.

Figure 9:
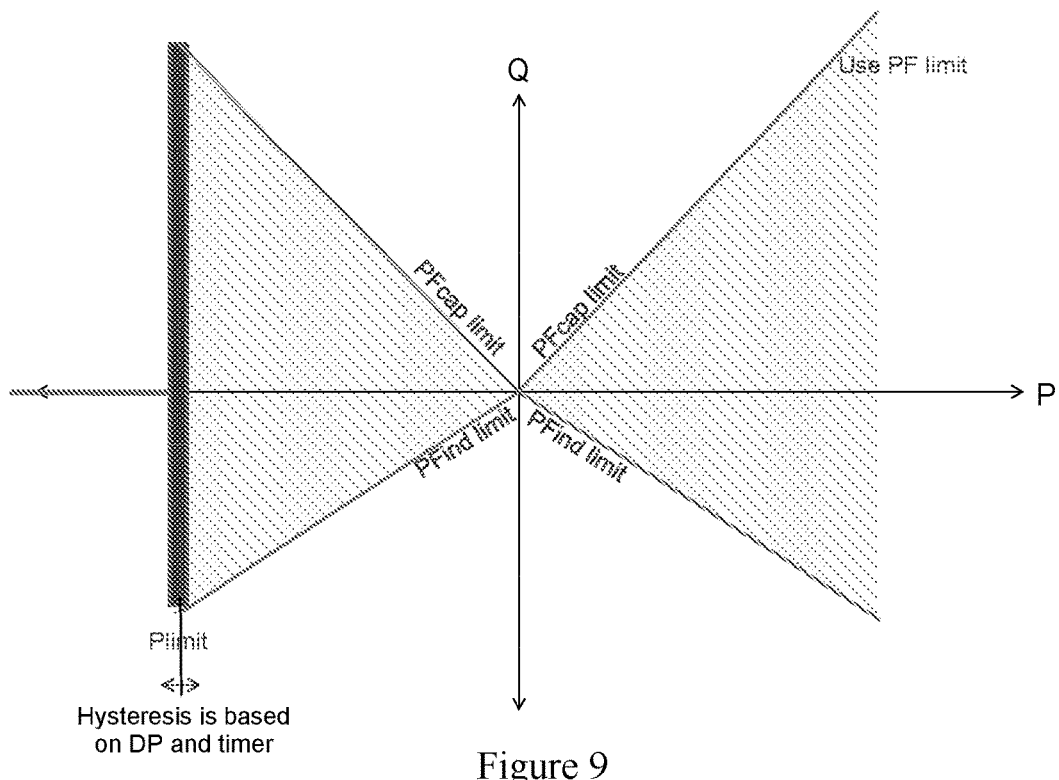
FIG. 9 shows PQ chart with the following case: Use Qlimits=0, Use PFlimits=1, Use Plimit=1 and Use Pmin=0.

FIG. 9 shows PQ chart with the following case: Use Qlimits=0, Use PFlimits=1, Use Plimit=1 and Use Pmin=0. FIG. 9 shows a PQ chart where the reactive power production is constrained by a power factor limit, PFcap limit and PFind limit, for capacitive and inductive mode respectively. The amount of negative active power is limited by Plimit.

Figure 10:
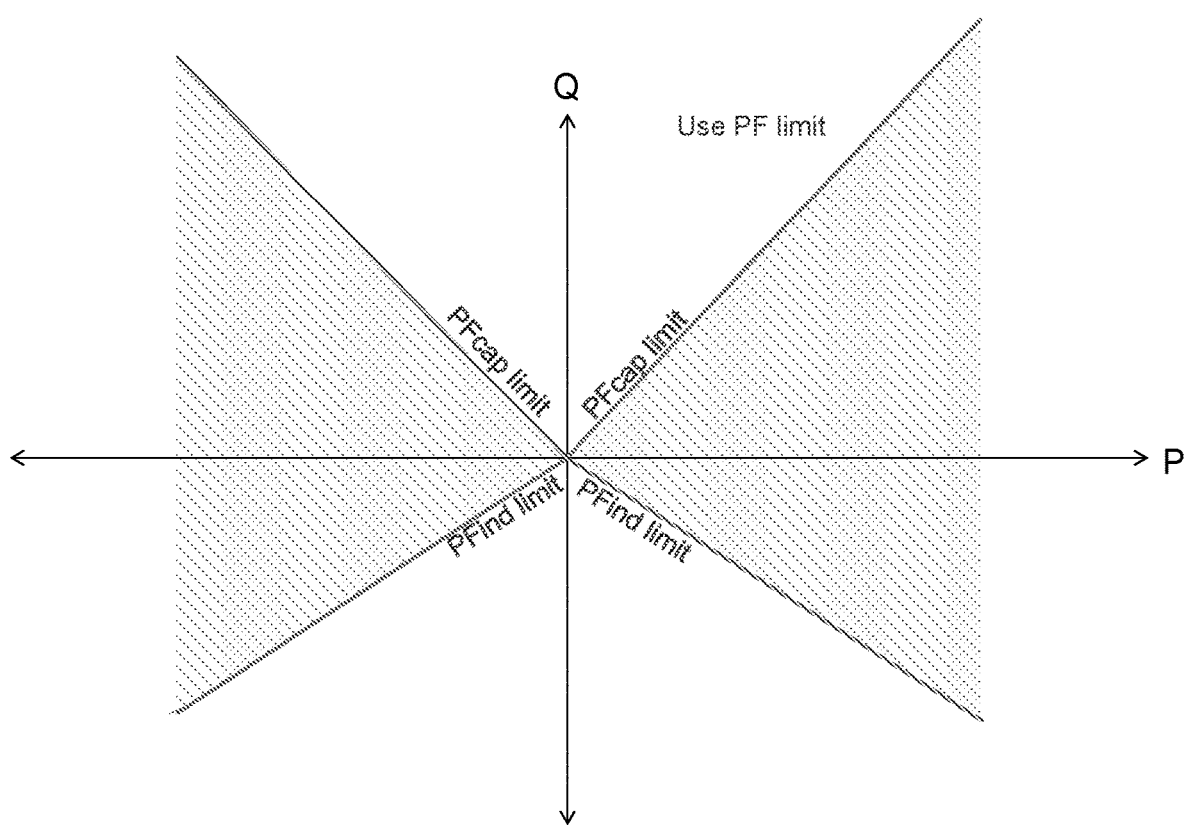
FIG. 10 shows PQ chart with the following case: Use Qlimits=0, Use PFlimits=1, Use Plimit=0 and Use Pmin=0.

FIG. 10 shows PQ chart with the following case: Use Qlimits=0, Use PFlimits=1, Use Plimit=0 and Use Pmin=0. FIG. 10 differ from FIG. 9, as the amount of negative active power is not limited by Plimit.

Figure 11:
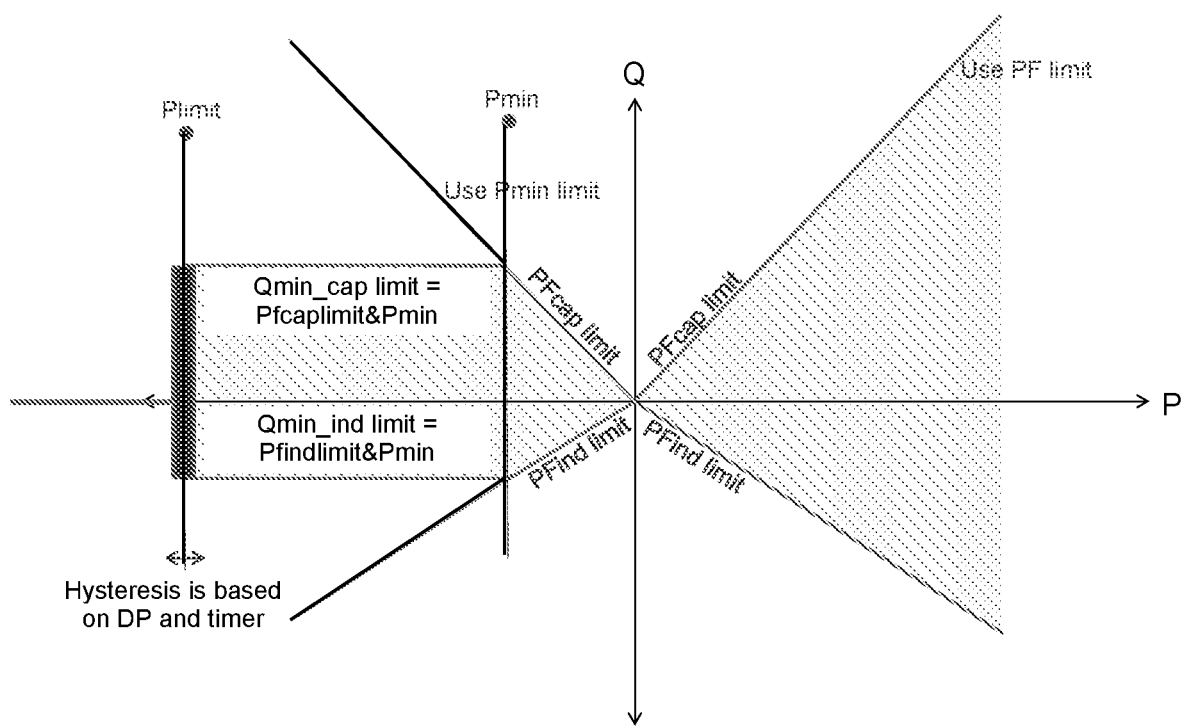
FIG. 11 shows PQ chart with the following case: Use Qlimits=0, Use PFlimits=1, Use Plimit=1, and Use Pmin=1 (note that no hysteresis apply for Pmin).

FIG. 11 shows PQ chart with the following case: Use Qlimits=0, Use PFlimits=1, Use Plimit=1, and Use Pmin=1. In this chart a combination of power factor and reactive power limitation is used, as power factor limitation is used as long as the amount of negative active power is within Pmin, when the Pmin threshold is exceeded the power plant controller limits the reactive power to Qmin_cap limit and Qmin_ind limit.

Figure 12:
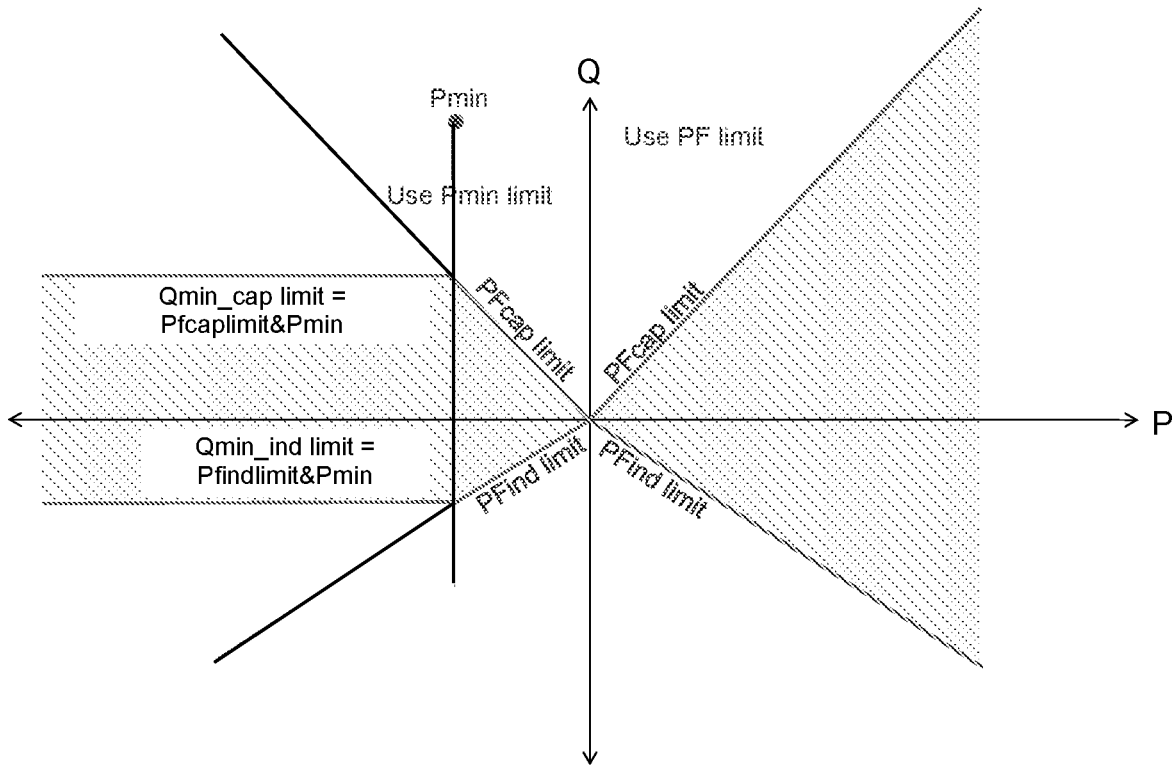
FIG. 12 shows PQ chart with the following case: Use Qlimits=0, Use PFlimits=1, Use Plimit=0 and Use Pmin=1.

FIG. 12 shows PQ chart with the following case: Use Qlimits=0, Use PFlimits=1, Use Plimit=0 and Use Pmin=1. This Figure differs from FIG. 11 as the amount of negative active power is not limited by Plimit.

Figure 13:
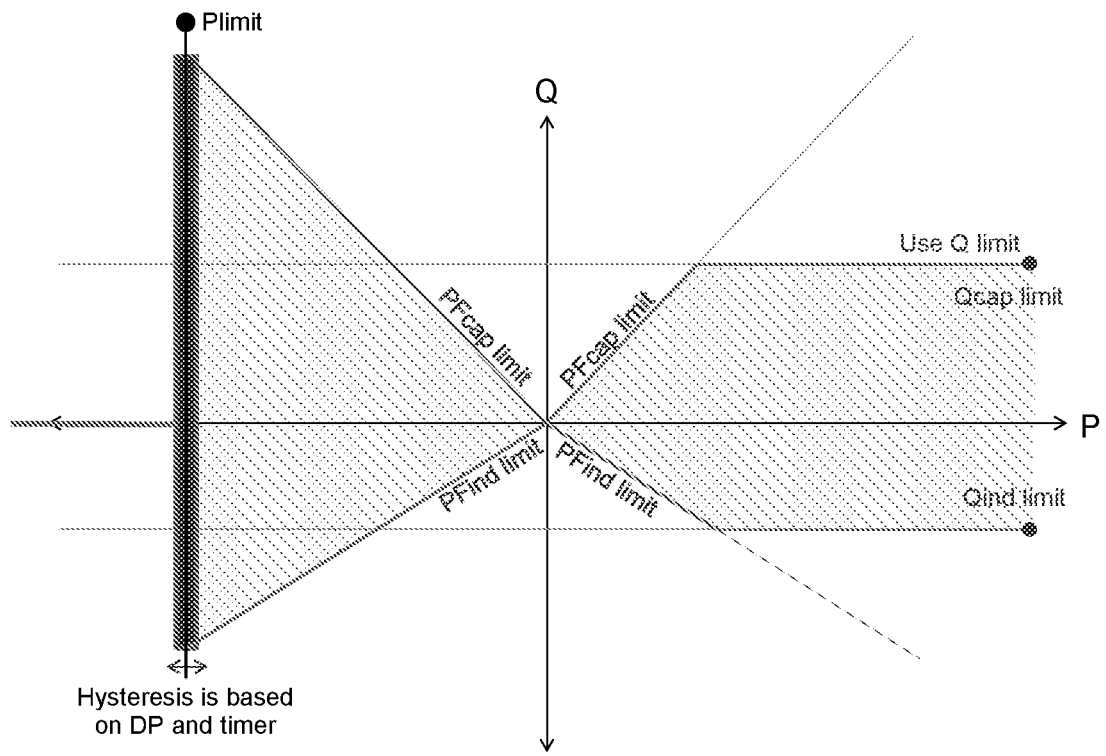
FIG. 13 shows PQ chart with the following case: UseQlimits=1, Use Plimit=1, Use PFlimits=1 and Use Pmin=0.

FIG. 13 shows PQ chart with the following case: Use-Qlimits=1, Use Plimit=1, Use PFlimits=1 and Use Pmin=0. Here the power plant controller operates similar to the operational mode of FIG. 9, whenever the active power is negative, but in the positive active power range, i.e. first and fourth quadrant of the coordinate system the reactive power is constrained by a power factor PFcap limit and PFind limit as long as the reactive power is within Qcap limit and Qind limit.

Figure 14:
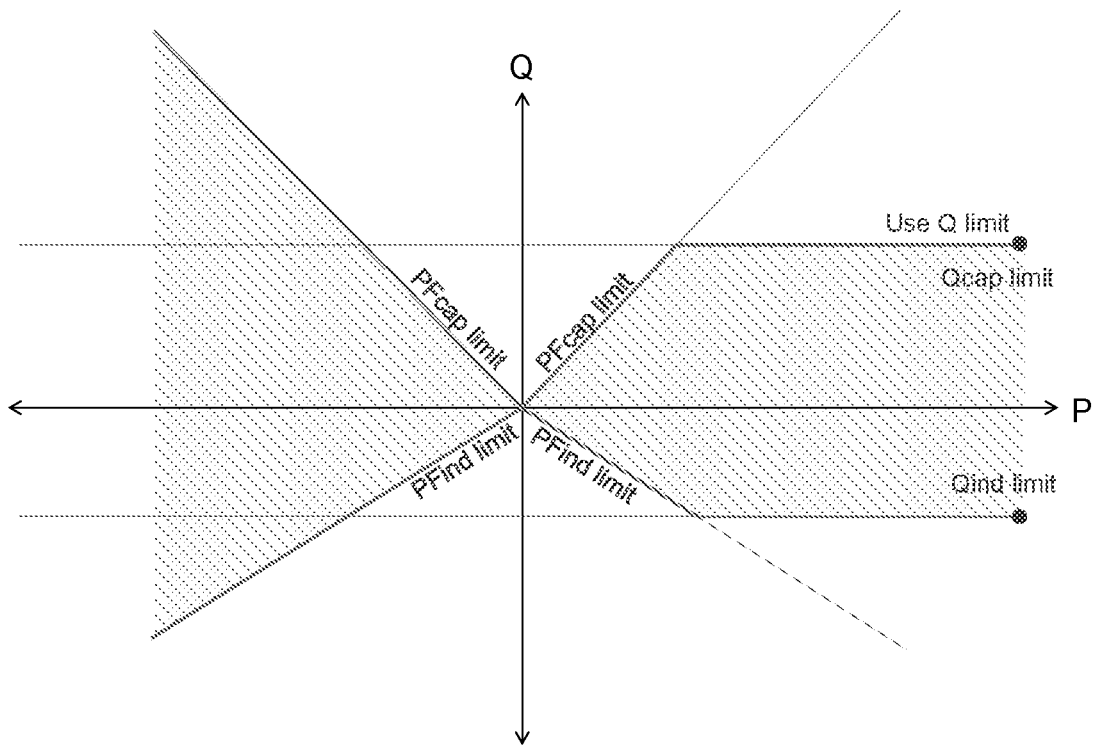
FIG. 14 shows PQ chart with the following case: UseQlimits=1, Use Plimit=0, Use PFlimits=1 and Use Pmin=0.

FIG. 14 shows PQ chart with the following case: Use-Qlimits=1, Use Plimit=0, Use PFlimits=1 and Use Pmin=0. FIG. 14 differ from FIG. 13 in that the amount of negative active power is not limited by Plimit.

Figure 15:
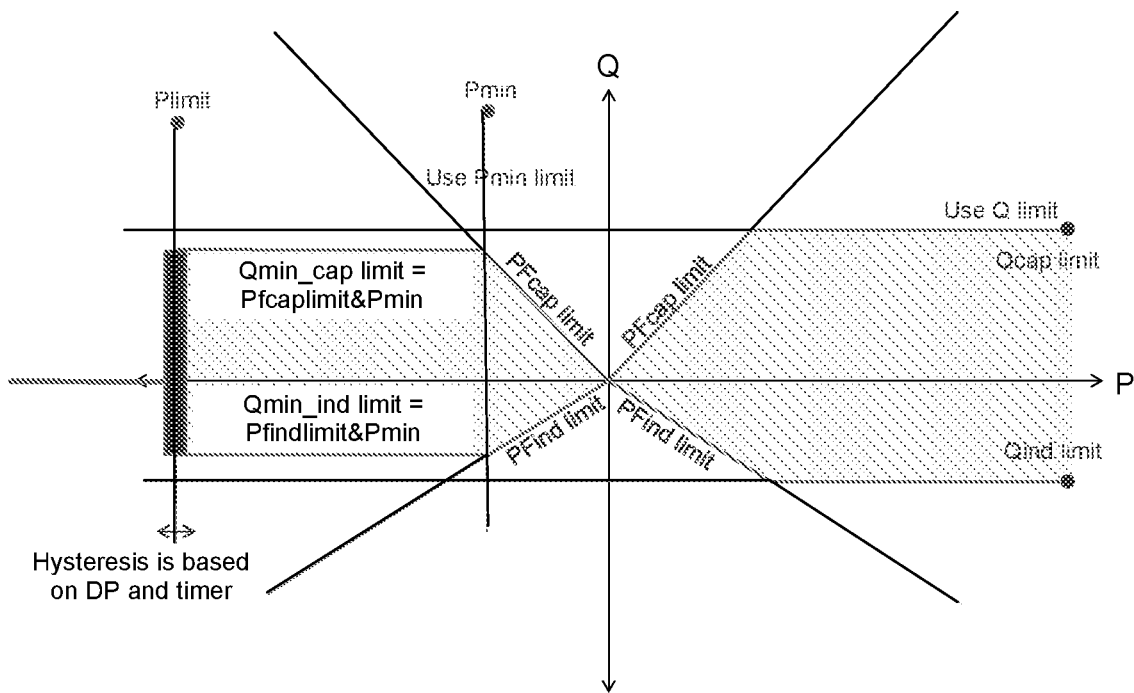
FIG. 15 shows PQ chart with the following case: UseQlimits=1, UsePFlimits=1, Use Plimit=1, and Use Pmin=1.

FIG. 15 shows PQ chart with the following case: Use-Qlimits=1, UsePFlimits=1, Use Plimit=1, and Use Pmin=1.

Figure 16:
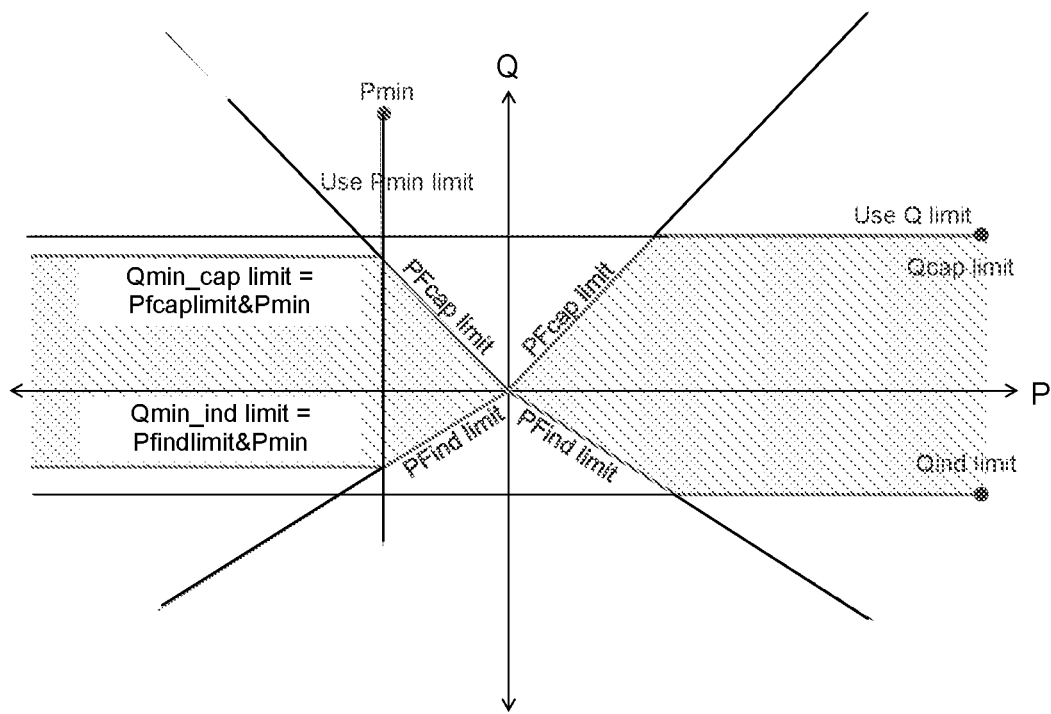
FIG. 16 shows PQ chart with the following case: UseQlimits=1, UsePFlimits=1, Use Plimit=0, and Use Pmin=1.

FIG. 16 shows PQ chart with the following case: Use-Qlimits=1, UsePFlimits=1, Use Plimit=0, and Use Pmin=1.

FIGS. 15 and 16 shows combinations of the different operational modes. They differ from each other in that FIG. 15 shows that the amount of negative active power is limited by Plimit.

Figure 17:
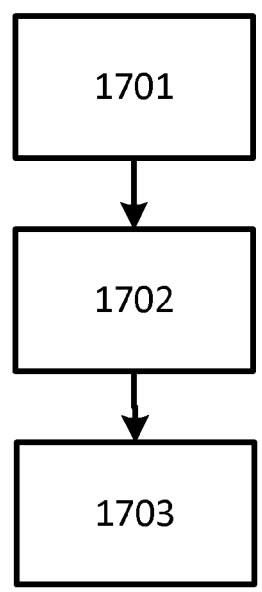
FIG. 17 shows a flow chart of method according to an aspect of the invention.

FIG. 17 shows a flow chart of method according to an aspect of the invention for controlling a wind power plant connected to an electrical grid, the wind power plant comprises a plurality of wind turbine generators. Step 1701 is controlling a wind power plant connected to an electrical grid, step 1702 is receiving a signal indicative of a pre- defined event in the wind power plant, and last step 1703 is controlling the wind power plant so that the produced power, from the wind power plant to the electric grid, is a negative amount of active power.

FIG. 18 shows a flow chart of an exemplary method 1800 for controlling a wind power plant connected to an electrical grid, wherein the wind power plant comprises a plurality of wind turbine generators and at least one energy storage unit. The method 1800 begins at block 1805, where the plurality of wind turbine generators provide at least reactive power to the electrical grid. At block 1815, a power plant controller receives a signal indicative of a requirement to charge the energy storage unit. At block 1825, the power plant controller determines that an amount of active power required to charge the energy storage unit is greater than an amount of active power generated by the plurality of wind turbine generators. At block 1835, the power plant controller imposes one or more negative active power limits for a net active power provided from the wind power plant to the electrical grid. The one or more negative active power limits comprises a first negative active power limit that permits the energy storage unit to be charged while the plurality of wind turbine generators continue to provide reactive power to the electrical grid. At block 1845, the energy storage unit is charged at least partly using power drawn from the electrical grid. The net active power is a negative active power and is controlled according to the one or more negative active power limits.

In summary the invention relates to, a power plant controller (PPC), the power plant controller to control produced power from a wind power plant (WPP), the wind power plant comprises at least a plurality of wind turbine generators, the wind power plant being connected to an electrical grid, wherein the power plant controller, in the event of receiving a signal indicative of a predefined event in the wind power plant, is capable of controlling the wind power plant so that the produced power, from the wind power plant to the electric grid, is a negative amount of active power. The invention also relates to a method for controlling a wind power plant connected to an electrical grid, the wind power plant comprises a plurality of wind turbine generators.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A power plant controller for a wind power plant connected to an electrical grid, wherein the wind power plant comprises a plurality of wind turbine generators and at least one energy storage unit, the power plant controller comprising:

one or more computer processors configured to:
  while the plurality of wind turbine generators provide at least reactive power to the electrical grid, receive a signal indicative of a requirement to charge the energy storage unit;
  determine that an amount of active power required to charge the energy storage unit is greater than an amount of active power generated by the plurality of wind turbine generators;
  impose one or more negative active power limits for a net active power provided from the wind power plant to the electrical grid, wherein the one or more negative active power limits comprises a first negative active power limit that permits the energy storage unit to be charged while the plurality of wind turbine generators continue to provide reactive power to the electrical grid; and
  charge the energy storage unit at least partly using power drawn from the electrical grid, wherein the net active power is a negative active power and is controlled according to the one or more negative active power limits.

2. The power plant controller of claim 1, wherein controlling the net active power provided from the wind power plant comprises:
  controlling one or more electrical parameters selected from: an active power, a reactive power, a power factor, a voltage, and a current.

3. The power plant controller of claim 1, wherein controlling the net active power provided from the wind power plant comprises:
  setting a reactive power reference to zero when the negative active power is less than the first negative active power limit of the one or more negative active power limits.

4. The power plant controller of claim 1, wherein controlling the net active power provided from the wind power plant comprises:
  controlling a reactive power reference according to a power factor limit.

5. The power plant controller of claim 4, wherein the power factor limit is inductive or capacitive.

6. The power plant controller of claim 1, wherein at least one of the one or more negative active power limits is set according to a cost function of the active power.

7. The power plant controller of claim 1, wherein at least one of the one or more negative active power limits is set according to losses in the wind power plant.

8. The power plant controller of claim 1, wherein at least one of the one or more negative active power limits comprises one or both of:
  a hysteresis band; and
  a timer function.

9. A wind power plant connected to an electrical grid, the wind power plant comprising:
  a plurality of wind turbine generators;
  at least one energy storage unit; and
  a power plant controller configured to:
    while the plurality of wind turbine generators provide at least reactive power to the electrical grid, receive a signal indicative of a requirement to charge the energy storage unit;
    determine that an amount of active power required to charge the energy storage unit is greater than an amount of active power generated by the plurality of wind turbine generators;
    impose one or more negative active power limits for a net active power provided from the wind power plant to the electrical grid, wherein the one or more negative active power limits comprises a first negative active power limit that permits the energy storage unit to be charged while the plurality of wind turbine generators continue to provide reactive power to the electrical grid; and
    charge the energy storage unit at least partly using power drawn from the electrical grid, wherein the net active power is a negative active power and is controlled according to the one or more negative active power limits.

10. A method for controlling a wind power plant connected to an electrical grid, wherein the wind power plant comprises a plurality of wind turbine generators and at least one energy storage unit, the method comprising:
  while the plurality of wind turbine generators provide at least reactive power to the electrical grid, receiving a signal indicative of a requirement to charge the energy storage unit;
  determining that an amount of active power required to charge the energy storage unit is greater than an amount of active power generated by the plurality of wind turbine generators;
  imposing one or more negative active power limits for a net active power provided from the wind power plant to the electrical grid, wherein the one or more negative active power limits comprises a first negative active power limit that permits the energy storage unit to be charged while the plurality of wind turbine generators continue to provide reactive power to the electrical grid; and
  charging the energy storage unit at least partly using power drawn from the electrical grid, wherein the net active power is a negative active power and is controlled according to the one or more negative active power limits.

11. The method of claim 10, wherein controlling the net active power provided from the wind power plant comprises:
  controlling one or more electrical parameters selected from: an active power, a reactive power, a power factor, a voltage, and a current.

12. The method of claim 10, wherein controlling the net active power provided from the wind power plant comprises:
  setting a reactive power reference to zero when the negative active power is less than the first negative active power limit of the one or more negative active power limits.

13. The method of claim 10, wherein controlling the net active power provided from the wind power plant comprises:
  controlling a reactive power reference according to a power factor limit.

14. The method of claim 10, wherein at least one of the one or more negative active power limits is set according to a cost function of the active power.

15. The power plant controller of claim 1, wherein the amount of active power generated by the plurality of wind turbine generators is zero.

* * * * *